United States Patent Office 3,404,141
Patented Oct. 1, 1968

3,404,141
POLYMERIZATION CATALYSTS AND THEIR USE
Gerald Digby Torrington Owen, Heswall, England, assignor to The Dunlop Company Limited, London, England, a British company
No Drawing. Filed Apr. 24, 1964, Ser. No. 362,476
Claims priority, application Great Britain, May 25, 1963, 20,979/63
19 Claims. (Cl. 260—94.3)

This invention relates to polymerization catalysts and to a method of polymerization employing such catalysts and is an improvement in or modification of the invention described and claimed in co-pending U.S. application Ser. No. 261,227, filed Feb. 26, 1963, now Patent No. 3,288,769 which is assigned to a common assignee.

In co-pending application No. 8120/62, there is described and claimed a method for the preparation of a catalyst component which comprises reacting under substantially-anhydrous conditions a higher halide of a metal of the "A" sub-Groups of Groups IV to VII or Group VIII of the Periodic Table (Mendeleeff) with a reducing agent comprising a metal of Groups I to III of the Periodic Table or a hydride or an organo-metallic compound of said metal to reduce said higher halide to a lower halide, mixing said lower halide with a further higher halide of a metal different from the first-mentioned metal, but selected from the same Groups of the Periodic Table, and reacting said further higher halide with said reducing agent to reduce it to a lower halide.

According to the present invention, a method for the preparation of a catalyst component comprises reacting under substantially-anhydrous conditions a higher halide of a metal of the A sub-Groups of Groups IV to VII or Group VIII of the Periodic Table with a reducing agent comprising a metal of Groups I to III of the Periodic Table (Mendeleeff) or a hydride or an organo-metallic compound of said metal to reduce said higher halide to a lower halide, mixing said lower halide with a further higher halide of a metal different from the first-mentioned metal, but selected from the same groups of the Periodic Table, reacting said further higher halide with said reducing agent to reduce it to a lower halide, and mixing a zinc dialkyl with the mixture of lower halides.

The polymerization catalyst component prepared according to the method of the present invention is particularly useful for effecting the polymerization of unsaturated monomers and when the catalyst component is to be used in this manner, it is mixed with a further catalyst component to form the active polymerization catalyst. The further catalyst component comprises a Group III metal compound which may be a metal hydride, an organo-metallic compound, an organo-metallic hydride or an organo-metallic halogen compound.

Typical further catalyst components are the alkyl compounds of Group III metals, preferably aluminium, in which the alkyl groups contain 2 to 8 carbon atoms. Examples of such alkyl metal compounds are aluminium triethyl, aluminium tri-n-propyl, aluminium triisopropyl, aluminium tri-n-butyl, aluminium triisobutyl, and aluminium trioctyl. Dialkyl aluminium compounds can also be used and examples of these are dialkyl aluminium halides, particularly the chlorides such as diethyl aluminum chloride.

The invention also includes a method of polymerizing unsaturated monomers in which one or more unsaturated monomers are polymerized in the presence of a polymerization catalyst formed by mixing the polymerization catalyst component prepared according to the method of the invention and a further catalyst component referred to hereinbefore. The invention is of particular interest in the polymerization of isoprene whereby a trans-1,4-polyisoprene is obtained which has increased rate and extent of crystallisation as compared with the catalyst prepared as in co-pending U.S. application Ser. No. 261,227 when no zinc alkyl was added. The polymerization may be carried out in the presence of diisopropyl ether.

The polymerization catalyst component is prepared, as already stated, by reducing a higher halide of the appropriate metal with a reducing agent, and then a further higher halide of a different metal is mixed with the lower halide so obtained, and it is also reduced to a lower halide by reaction of the reducing agent. The term "higher halide," when used in this specification, is defined as a halide of a metal in its highest valency state and the term "lower halide" is hereby defined as a halide of a metal in a valency state lower than this valency state. The preferred higher halides are the halides of titanium, zirconium, vanadium, tantalum, tungsten, manganese, iron, cobalt, and nickel, while chlorine is the preferred halogen. Examples of these compounds are titanium tetrachloride zirconium tetrachloride, tungsten hexachloride, and vanadium tetrachloride.

The reducing agent which is used to reduce the valency state of the higher halide can comprise a metal, for example lithium, sodium, magnesium, aluminium, beryllium, or calcium, or can be a hydride or an organo-metallic compound of such a metal. Typical organo-metallic compounds are those which have already been mentioned for use as the further catalyst component, for example the alkyl metal compounds of Group III metals and in fact, it is preferred to use such compounds since they not only bring about the reduction of the higher halide to a lower halide, but also form part of the catalyst system. Other reducing agents are the zinc dialkyl compounds such as zinc diethyl, lithium butyl, lead tetraethyl, Grignard reagents and tin alkyls.

The reaction between the reducing agent and the higher halides can be effected by adding a sufficient quantity of the reducing agent to reduce the first higher halide to its lower halide and then adding a further amount of reducing agent to reduce the further higher halide to a lower halide. Alternatively, a sufficient amount of the reducing agent can be employed in first instance to effect the reduction of both the halides without the need of adding a further amount of the reducing agent during the reaction. However, whether or not the latter of the two methods is to be used depends on the conditions of the reduction, for instance on the reactivity of the reducing agent, and the conditions should be such that reduction of either or both the higher halide and the further higher halide does not proceed beyond the desired stage.

The reaction between the higher halide and the reducing agent is preferably carried out in an inert liquid diluent such as a saturated aliphatic hydrocarbon or an aromatic hydrocarbon, e.g. liquid paraffin, decane, decalin, or benzene. The diluent is preferably an aliphatic hydrocarbon. The reaction should also be carried out in the absence of water and, if desired, can be carried out at an elevated temperature. When an aluminum compound is used as the reducing agent then the reduction proceeds at room temperature but when a zinc compound or a mercury compound is used then it is desirable that the reduction reaction should be carried out at an elevated temperature, say up to 125° C.

When the catalyst component is to be used for the polymerization of one or more unsaturated monomers the further catalyst component and the required amount of a zinc dialkyl are added to the combined reduced halides to form the active polymerization catalyst. It has been found that the degree of crystallinity and rate of crystallisation of trans-polyisoprene so prepared depends on the amount of zinc dialkyl used and the higher the amount of zinc dialkyl the higher are these two polymer properties. Generally, an amount of zinc dialkyl is used such that the molar ratio of the zinc dialkyl to the lower halide of the further higher halide is from 0.1:1 to 10:1 and preferably 0.5:1 to 3:1. The zinc dialkyl preferably contains from 1 to 6 carbon atoms in each alkyl group, and examples of suitable zinc dialkyls are zinc diethyl and zinc dipropyl.

The method of preparation of polymerization catalyst components according to the present invention is particularly useful for the preparation of a catalyst component based on alpha-titanium trichloride and vanadium trichloride. In this method, titanium tetrachloride dissolved in dry liquid paraffin is treated at room temperature with a reducing agent, for example aluminium triethyl and reduced to titanium trichloride. The reaction mixture is then heated at a temperature between 135° C. and 225° C. to convert the titanium trichloride into the alpha form. The further higher halide, preferably vanadium tetrachloride, is then added to the cooled reaction mixture and then is added a further amount of aluminium triethyl to bring about the reduction of the vanadium tetrachloride to vanadium trichloride. Preferably, the molar ratio of titanium:vanadium in the catalyst component should be within the range 1:4 to 4:1. The catalyst prepared in this way is wholly or substantially insoluble in hydrocarbon solvents such as petrol and benzene. The catalyst component, so produced, is further mixed with an organo-metallic compound which is preferably aluminium triethyl, and the requisite amount of zinc diethyl prior to use.

As already indicated, the catalyst when prepared by the method of the present invention is extremely effective for the polymerization of unsaturated monomers, for example olefines such as ethylene and propylene, and dienes such as butadiene and isoprene, also copolymers of one or more olefines can be produced. The catalyst is of particular use in the polymerization of isoprene, especially using a catalyst based on titanium trichloride and vanadium trichloride. It has been found that in this case the degree of crystallinity may be considerably increased when using the method of the present invention, in comparison with a similar method with zinc diethyl omitted.

The invention is illustrated in the following examples:

Example I

This example illustrates the preparation of the catalyst and the use of this catalyst to polymerize isoprene.

A vanadium trichloride/titanium trichloride combination catalyst with a vanadium/titanium ratio of 0.5, was prepared under dry nitrogen in the following manner:

To a solution of 2.2 millilitres (0.02 mole) titanium tetrachloride in 200 ml. dry liquid paraffin, was added 10.3 ml. (0.008 mole) aluminium triethyl in a petroleum solution over a period of 15 minutes. The reactants were stirred at room temperature for a further 30 minutes, at 65° C. for 30 minutes, and at 120° C. for 30 minutes. The beta-titanium trichloride so formed, was transformed to alpha-titanium trichloride by heating the slurry for 10 minutes at 180° C. After cooling the slurry to room temperature, 1.07 ml. (0.01 mole) vanadium tetrachloride were added, followed by 4.3 ml. (0.0033 mole) aluminium triethyl solution over a 15 minute period. A similar heating sequence up to 120° C. was carried out. The catalyst was centrifuged, washed with dry petrol and finally dispersed in dry petrol to form a slurry containing 38.2 grammes of the combined reduced halides per litre.

To a dry 6-oz. vessel, flushed with dry nitrogen, 100 ml. petrol, 25 ml. isoprene, and 0.63 ml. of an aluminium triethyl solution in petrol containing 88.2 grammes of the aluminium triethyl per litre, were added. The requisite amount (as shown in Table I) of zinc diethyl was added and 1.54 ml. of the combination catalyst slurry. The vessel was sealed and shaken at a temperature of 50° C. until approximately 25 percent conversion was attained.

The results are summarized in Table I:

TABLE I

| Expt. No. | $AlEt_3/VCl_3$ | $ZnEt_2/VCl_3$ | Percent Conv. | $T_{1/2}$ (min.) | Percent Cryst. |
|---|---|---|---|---|---|
| 1 | 10 | 0 | 25.0 | 23.5 | 26.9 |
| 2 | 10 | 0.5 | 27.2 | 21.0 | 27.4 |
| 3 | 10 | 1.0 | 26.9 | 15.5 | 27.7 |
| 4 | 15 | 3.0 | 17.3 | 10.5 | 31.4 |

In Experiment No. 4, the amount of aluminium triethyl was increased.

$T_{1/2}$ represents the crystallinity half-times of the polymers.

It can be seen from the above results that as the ratio of zinc diethyl to vanadium trichloride increases, so the percentage crystallinity of the product increases and the crystallinity half-time ($T_{1/2}$) decreases.

Example II

This example illustrates the further use of the catalyst when the composition of the catalyst was changed. The polymerization was stopped at approximately 20 percent conversion.

The method of polymerizing isoprene according to Example I was repeated but 2.0 ml. of the slurry of the combination catalyst was used. The reaction was allowed to proceed until approximately 20 percent conversion was attained.

The results are summarised in Table II:

TABLE II

| $AlEt_3/VCl_3$ | $ZnEt_2/VCl_3$ | Percent Conv. | $T_{1/2}$ (min.) | Percent Cryst. |
|---|---|---|---|---|
| 10 | 0 | 21 | 23 | 27.0 |
| 10 | 0.5 | 21 | 13.5 | 28.2 |
| 10 | 1.0 | 18 | 10.0 | 30.0 |
| 10 | 2.0 | 18 | 9.5 | 31.0 |

As shown in Example I, the degree of crystallinity of the product and its ratio of crystallisation, increase as the $ZnEt_2/VCl_3$ ratio is increased.

Example III

This example illustrates the effectiveness of $ZnEt_2$ addition at higher monomer conversions and under varying $AlEt_3/VCl_3$ ratios and varying $ZnEt_2/VCl_3$ ratios. The polymerization method was the same as in Example II, except for the changes shown in Table III. The polymerizations were stopped at 33 percent conversion.

TABLE III

| $ZnEt_2/VCl_3$ | $AlEt_3/VCl_3$ | $T_{1/2}$ (min.) | Percent Cryst. |
|---|---|---|---|
| 0 | 45 | 35.0 | 25.5 |
| 4 | 30 | 14.5 | 30.8 |

Having now described my invention, what I claim is:

1. A method for the polymerization of isoprene comprising preparing a polymerization catalyst component by reacting under substantially-anhydrous conditions in the presence of an inert liquid diluent a higher halide of a metal selected from Group IVA of the Mendeleeff Periodic Table with a reducing agent selected from the class consisting of the metals of Groups I to III of the Mendeleeff Periodic Table, hydrides of said metals and organo-metallic compounds of said metals to reduce said higher halide to a lower halide, mixing said lower halide with a further high halide of a metal selected from Group VA of the Mendeleeff Periodic Table, reacting said further higher halide with said reducing agent to reduce said further higher halide to a lower halide, mixing said catalyst component with further catalyst components being an aluminium trialkyl and a zinc dialkyl, and polymerizing isoprene in the presence of the catalyst so produced to effect polymerization of the isoprene.

2. A method according to claim 1 in which the reaction between the higher halides and the reducing agent is carried out at a temperature of up to 125° C.

3. A method according to claim 2 in which the reaction between the higher halides and the reducing agent is carried out at room temperature.

4. A method according to claim 1 in which each alkyl group of the zinc dialkyl contains from 1 to 6 carbon atoms.

5. A method according to claim 4 in which the zinc dialkyl is zinc diethyl.

6. A method according to claim 1 in which the amount of zinc dialkyl used is such that the molar ratio of the zinc dialkyl to the lower halide obtained by reducing said further higher halide is from 0.1:1 to 10:1.

7. A method according to claim 6 in which the amount of zinc dialkyl is such that the molar ratio of the zinc dialkyl to the lower halide obtained by reducing said further higher halide is from 0.5:1 to 3:1.

8. A method according to claim 1 in which the amount of the reducing agent which is added to the first-mentioned higher halide is not substantially in excess of the amount required to reduce the first-mentioned higher halide to a lower halide, and a further amount of the reducing agent is added to reduce said further higher halide to a lower halide.

9. A method according to claim 1 in which the amount of the reducing agent added to the first higher halide is sufficient to reduce both the higher halides to the lower halides.

10. A method according to claim 1 in which the reducing agent is aluminium triethyl.

11. A method according to claim 1 in which the inert liquid diluent is a liquid saturated aliphatic hydrocarbon.

12. A method according to claim 11 in which the inert liquid diluent is liquid paraffin.

13. A method according to claim 1 in which the inert liquid diluent is an aromatic hydrocarbon.

14. A method according to claim 1 in which the first-mentioned higher halide is alpha-titanium tetrachloride.

15. A method according to claim 14 in which the further higher halide is vanadium tetrachloride.

16. A method according to claim 15 in which the molar ratio of titanium to vanadium in the catalyst component is from 1:4 to 4:1.

17. A method according to claim 1 in which each alkyl group of the alumininum trialkyl in the further catalyst component contains from 2 to 8 carbon atoms.

18. A method according to claim 17 in which the aluminium trialkyl is aluminium triethyl.

19. A method according to claim 1 in which the polymerization reaction is effected in a solvent for the isoprene.

References Cited

UNITED STATES PATENTS 3,288,769    11/1966    Cooper et al. _____ 260—88.2

JOSEPH L. SCHOFER, *Primary Examiner.*

R. A. GAITHER, *Assistant Examiner.*